US008217309B2

(12) United States Patent
Burrows et al.

(10) Patent No.: US 8,217,309 B2
(45) Date of Patent: Jul. 10, 2012

(54) GLOW PLUG WITH PRESSURE SENSING CANISTER

(75) Inventors: John A. Burrows, Northwich (GB); Sandro Goretti, Rubiera (IT)

(73) Assignee: Federal-Mogul Italy Srl., Carpi (IT)

( * ) Notice: Subject to any disclaimer, the term of this patent is extended or adjusted under 35 U.S.C. 154(b) by 876 days.

(21) Appl. No.: 12/334,568

(22) Filed: Dec. 15, 2008

(65) Prior Publication Data

US 2010/0147822 A1 Jun. 17, 2010

(51) Int. Cl.
*F23Q 7/00* (2006.01)
*F23Q 7/22* (2006.01)

(52) U.S. Cl. ........................................ 219/267; 219/260

(58) Field of Classification Search ........... 219/260–270
See application file for complete search history.

(56) References Cited

U.S. PATENT DOCUMENTS

| 6,979,801 | B2 * | 12/2005 | Okazaki et al. ............... 219/270 |
| 7,228,730 | B2 | 6/2007 | Haussner et al. |
| 7,759,612 | B2 * | 7/2010 | Last et al. ..................... 219/260 |
| 2004/0182145 | A1 * | 9/2004 | Okazaki et al. ............. 73/119 R |
| 2007/0095811 | A1 | 5/2007 | Last |
| 2007/0163329 | A1 * | 7/2007 | Last et al. ..................... 73/35.12 |
| 2010/0147822 | A1 * | 6/2010 | Burrows et al. ............... 219/267 |

FOREIGN PATENT DOCUMENTS

| DE | 102005025115 | 12/2006 |
| DE | 102006008351 | 8/2007 |
| DE | 102006008351 A1 | 8/2007 |
| DE | 102006041124 | 3/2008 |
| DE | 102006049079 | 4/2008 |
| DE | 102006057627 | 6/2008 |
| DE | 102006059693 | 6/2008 |
| DE | 102008009429 | 9/2008 |
| DE | 102007049971 | 4/2009 |
| WO | WO 2006/072510 A1 | 7/2006 |
| WO | WO 2006/108939 A2 | 10/2006 |

* cited by examiner

*Primary Examiner* — Daniel L Robinson
(74) *Attorney, Agent, or Firm* — Robert L. Stearns; Dickinson Wright, PLLC

(57) ABSTRACT

A glow plug assembly includes an integrated, internal pressure sensor. In order to reduce loading on the center electrode, improve sensor responsiveness, and provide better thermal performance, the pressure sensor assembly is housed in a canister which forms a containment capsule and rigidly connects inside the glow plug shell near its seat area. The pressure sensor makes direct contact with the base end of the heater probe so that movements of the heater probe caused by fluctuations in gas pressure lead directly to changing force on the sensor stack.

21 Claims, 9 Drawing Sheets ated to the
GLOW PLUG WITH PRESSURE SENSING CANISTER

CROSS REFERENCE TO RELATED APPLICATIONS

None.

BACKGROUND OF THE INVENTION

1. Field of the Invention

This invention relates to a glow plug, and more particularly toward a glow plug having an integrated pressure sensing device for use in an internal combustion engine.

2. Related Art

Glow plugs are typically used in applications where a source of intense heat is required to either directly initiate or to aid in the initiation of combustion. As such, glow plugs are used in space heaters, industrial furnaces and diesel engines to name a few.

In the field of compression ignition engines, there are trends toward ever greater output and efficiency, as well as toward the use of flexible fuels, which together have increased the demand for and usage of various types of combustion sensors necessary to enable enhanced control of the engine and combustion processes. Combustion sensors, particularly combustion pressure sensors, have in the past been discrete sensors that are inserted into the combustion chamber through special threaded bores created just to accommodate these sensors. The sensors themselves have generally been used only in engine and engine control development, and not in mass production owing to their high cost and the additional demands they place on space around the cylinder head.

Several examples of glow plugs with integrated pressure sensors can be found in the prior art. A particular problem or concern with many, if not all, pressure sensing glow plug designs relates to the undesirable stresses introduced into the glow plug components, and particularly to the electrode itself, in order to adequately preload the pressure sensor. Joint strength between the electrode and heater probe components is quite often challenged by prior art designs which incorporate a pressure sensing device into the glow plug shell.

One prior art example may be found in US Publication No. 2007/0095811 published May 3, 2007. According to this design, a pressure sensing unit is preinstalled on the heater probe and pretensioned through an external support tube that is subsequently joined to the glow plug shell at its upper end. A particular drawback of this arrangement lies in the way its flexible membrane element between the glow plug shell and heater probe (to accommodate pressure fluctuations) is compressed along its length. A further drawback of this design resides in the location of its sensor element which protrudes into the combustion gas relatively far away from the cylinder head seat, and is thus subject to rapid thermal shock. These features lead to reduced working life and less than optimal functionality.

Taken as a whole, prior art glow plugs with integrated pressure sensors tend to place the center electrode or other force transmitting member in tension, with the shell components in compression. FIG. 2 provides an illustration of one such prior art glow plug design. The joint between the center electrode and the heater probe needs a tensile strength which is not required in normal glow plug operations, and which is very difficult to achieve. Furthermore, preloads or pretensioning on the sensor must be high enough to ensure that load always stays on the sensor under all conditions, even as changes in the sensed pressure reduce the preload. Doubtless, some random examples do exist where the center electrode is not tensioned, such as in the above-noted US 2007/0095811. However, these examples are prone to distortions and other design defects. Prior art designs also have a certain minimum length required for all necessary components, and rely on forces transmitted through the long and thin center electrode which can give problems of thermal performance and reduced sensitivity. Furthermore, manufacturing issues related to the assembly of a sensor stack, i.e., the stack of components which together function as a sensor assembly, complicate the necessary electrical connections.

Accordingly, there is a need for a glow plug with integrated pressure sensor that avoids placing unnecessary stress on the center electrode component, enables lower starting loads, better thermal performance, higher sensitivity, and does not require a strong bond from center electrode to heater probe. Furthermore, there is a need for such a glow plug and pressure sensor assembly that is more easily assembled in the context of high volume production.

SUMMARY OF THE INVENTION

The subject invention addresses the shortcomings exhibited in prior art designs by providing a glow plug assembly for an internal combustion engine, wherein the assembly has an integrated internal pressure sensor. The assembly comprises a shell having an axially extending bore, and an elongated heater probe. The heater probe has a base end disposed within the bore in electrical contact with the shell. An electrode is in electrical contact with the base end of the heater probe while being electrically insulated from the shell. A pressure sensor is disposed within the shell. The pressure sensor is supported against the base end of the heater probe and is adapted to measure pressure fluctuations when the glow plug assembly is installed in an engine. A canister is disposed within the shell and surrounds the pressure sensor. The canister extends between first and second ends, with its first end operatively fixed to the shell while its second end is in pressing contact with the pressure sensor. The canister establishes a compressive preload force on the pressure sensor without transmitting transient distortions that may occur in the shell to the pressure sensor.

According to another aspect of this invention, a method for manufacturing a glow plug assembly is provided. The method comprises the steps of: forming a shell having an axially extending bore, forming an elongated heater probe having a base end and a heating tip opposite the base end, supporting the base end of the heater probe within the bore of the shell so as to establish electrical conductivity between the shell and the heater probe, electrically connecting an electrode to the base end of the heater probe while maintaining electrical insulation between the electrode and the shell, providing a canister having first and second ends, attaching the first end of the canister to the shell, providing a pressure sensor, placing the pressure sensor inside the canister so that the pressure sensor rests against the base end of the heater probe, and compressing the pressure sensor with the second end of the canister to establish a preload force on the pressure sensor.

The subject invention, addresses the prior art shortcomings in that it does not depend on the electrode to transmit forces to or from the pressure sensor. Rather, the electrode passes through the pressure sensor generally untouched. This is distinguished from prior art systems like that depicted in FIG. 2. According to this invention, the pressure sensor is effectively placed directly onto the base end of the heater probe and pressed against it using a canister which surrounds the pressure sensor to form a containment capsule. The canister is rigidly connected to the shell preferably very near to its seat. Because the heater probe moves in response to pressure fluctuations but the shell does not, movement of the heater probe leads directly to changing forces on the pressure sensor. As force increases with applied gas pressure, the initial preload force can be relatively low. The force carrying elements can thus have a short length and high cross-sectional area, giving high stiffness and hence a high degree of sensor sensitivity. The canister can be designed with a short length and, owning to its enclosed nature, gives additional benefits of good thermal performance due to reduced differences in thermal expansion, which further contributes to a low starting preload. Electrical connections can be brought out as an easily accessible, coaxial configuration if desired. Manufacturing is aided by the alignment inherent in the assembly being inside the canister. The connection of the canister to the shell of the glow plug is arranged, preferably, to be very close to the end of the shell, i.e., near the seat, thereby minimizing signal distortion due to changing forces in the external shell of the glow plug.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
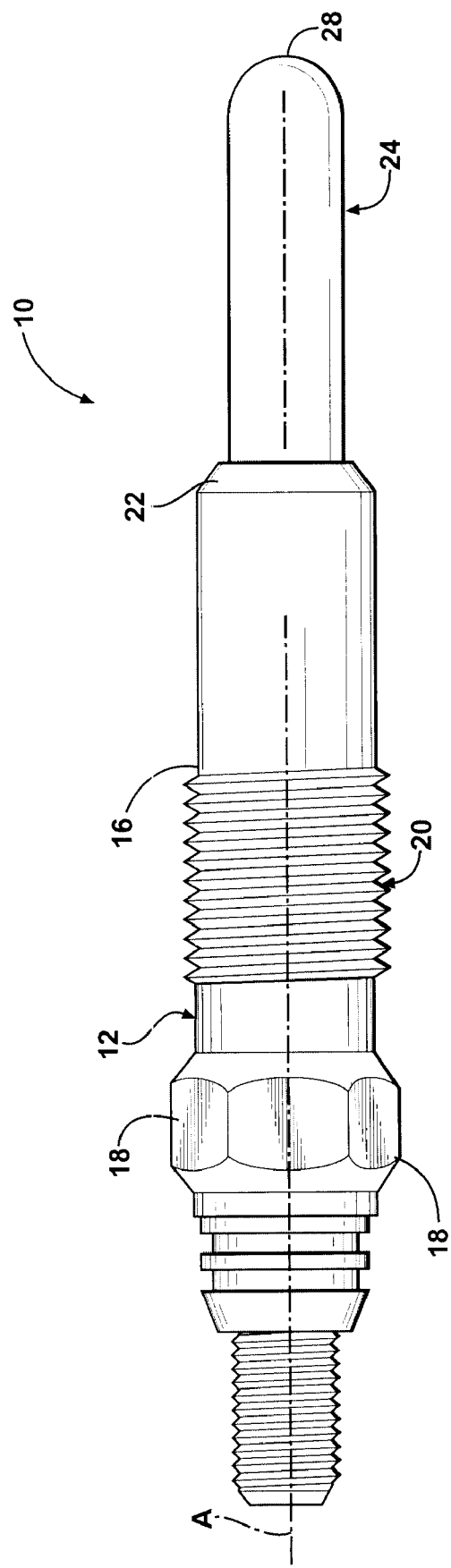
FIG. 1 is a side elevation view of a prior art glow plug assembly.
Figure 2:
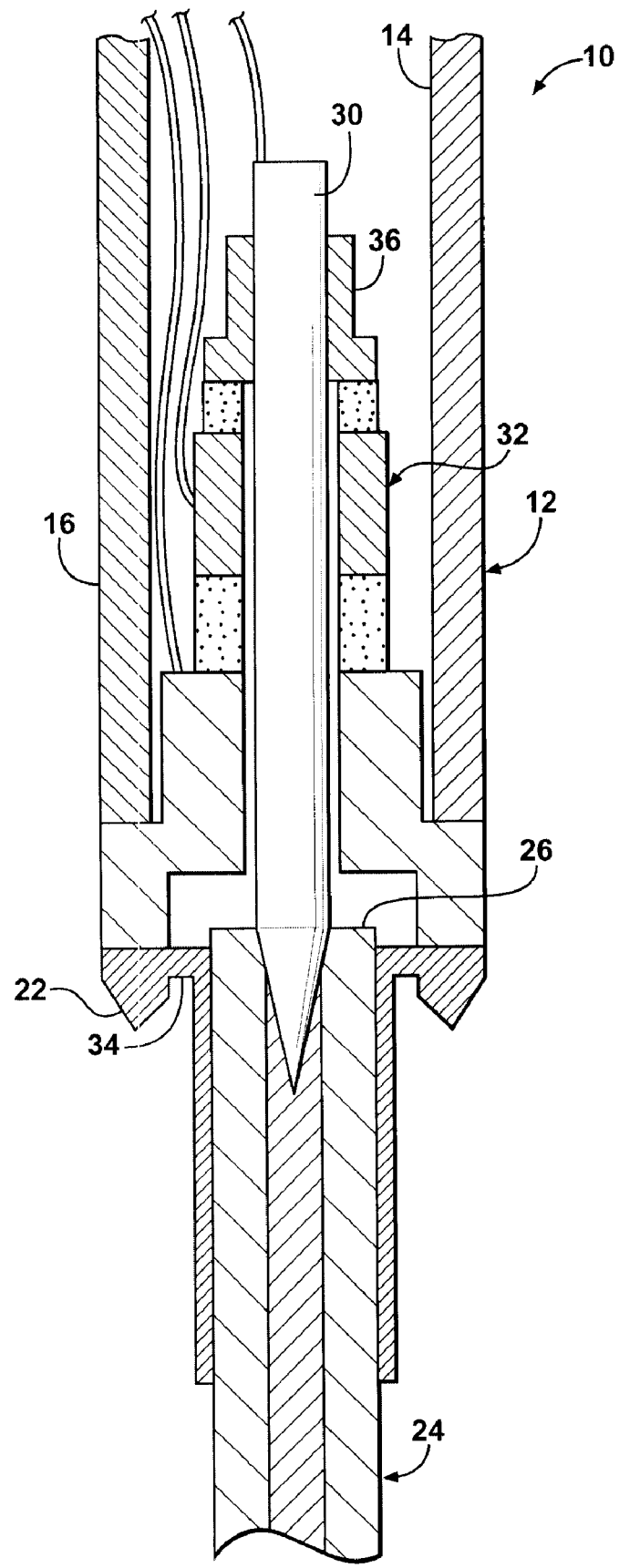
FIG. 2 is a fragmentary cross-sectional view of a prior art glow plug assembly including an integrated pressure sensing device, wherein the center electrode is placed in tension when the sensor assembly is preloaded.
Figure 3:
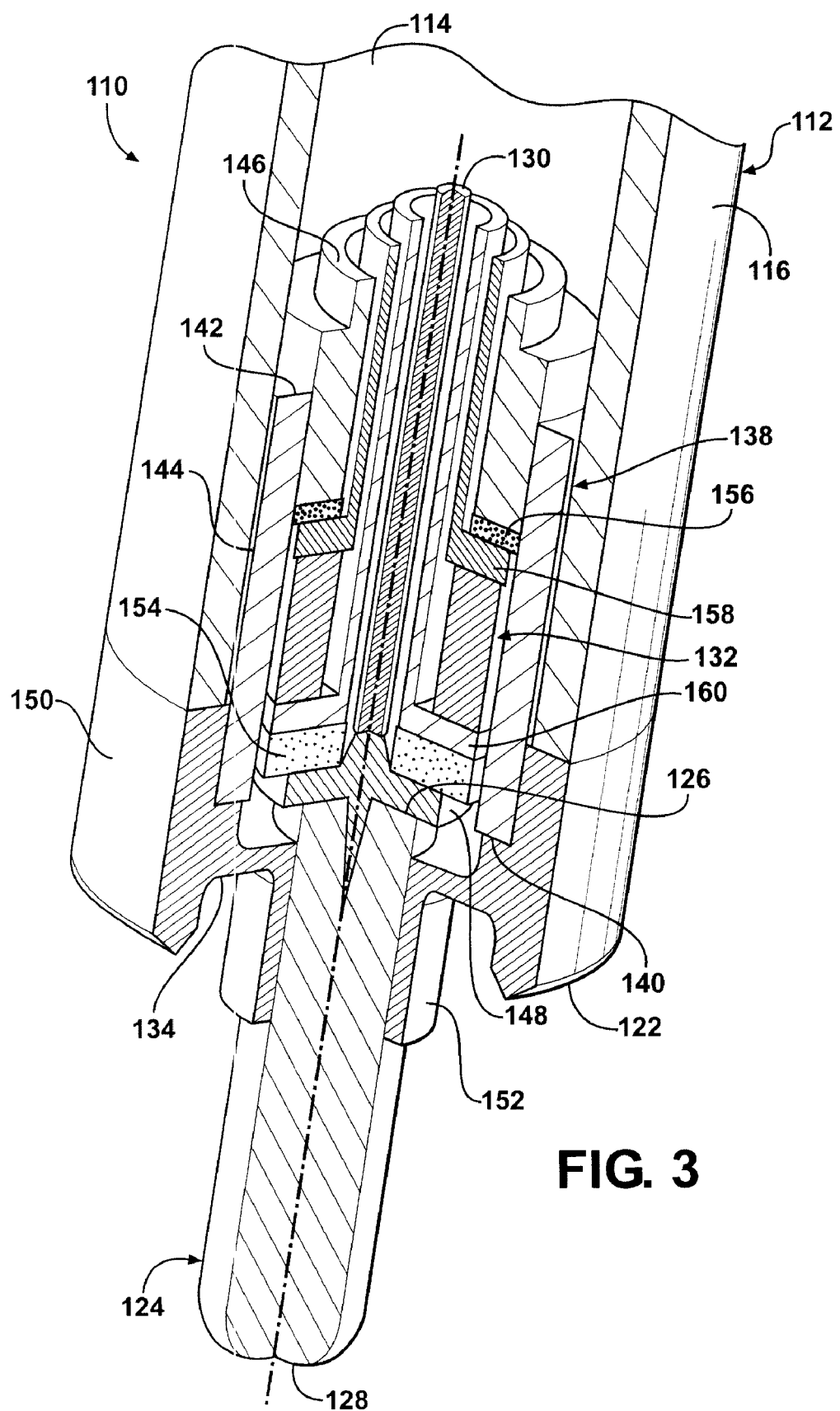
FIG. 3 is a fragmentary perspective view of a glow plug assembly according to the subject invention shown in quarter-section.
Figure 4:
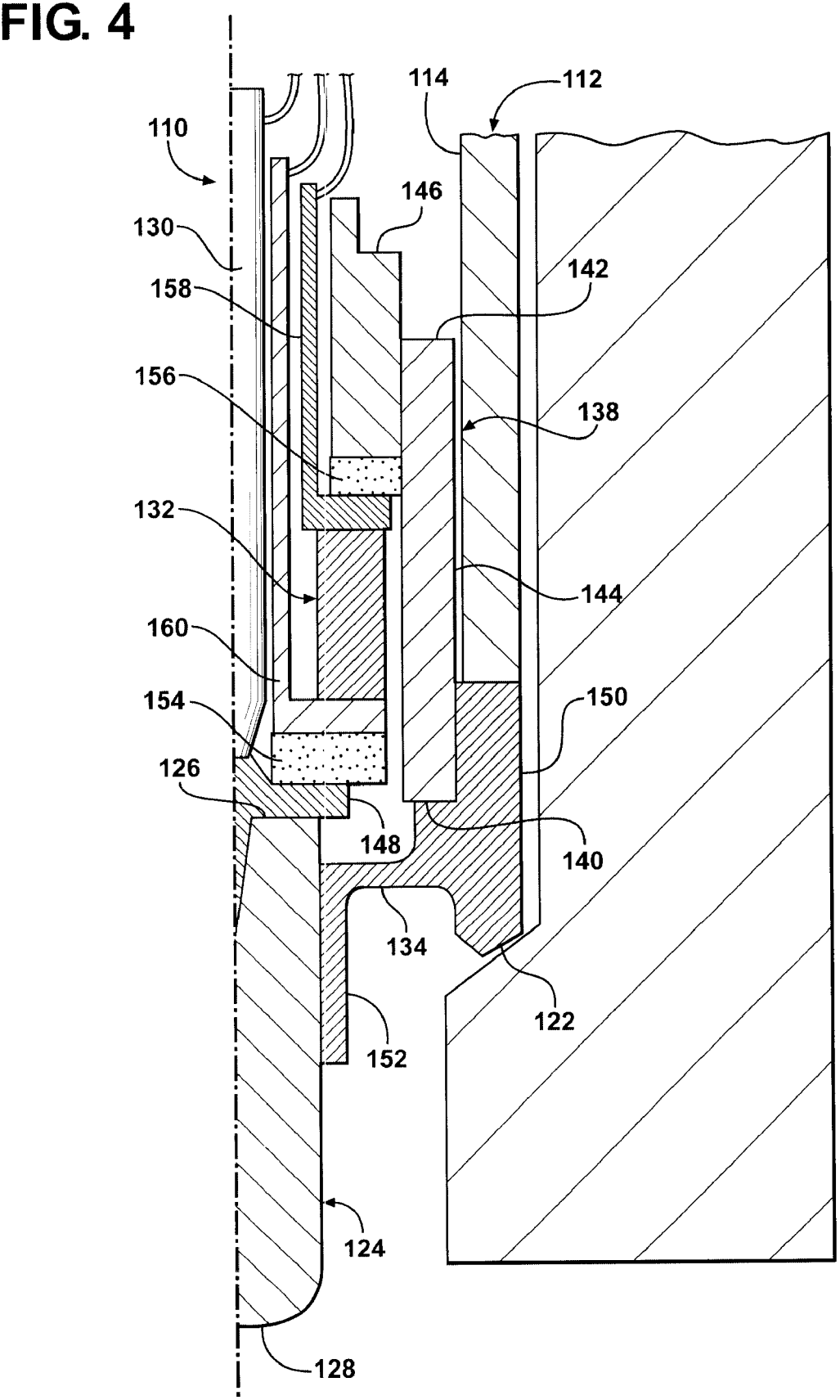
FIG. 4 is a partial cross-sectional view of the glow plug assembly of FIG. 3.
Figure 5:
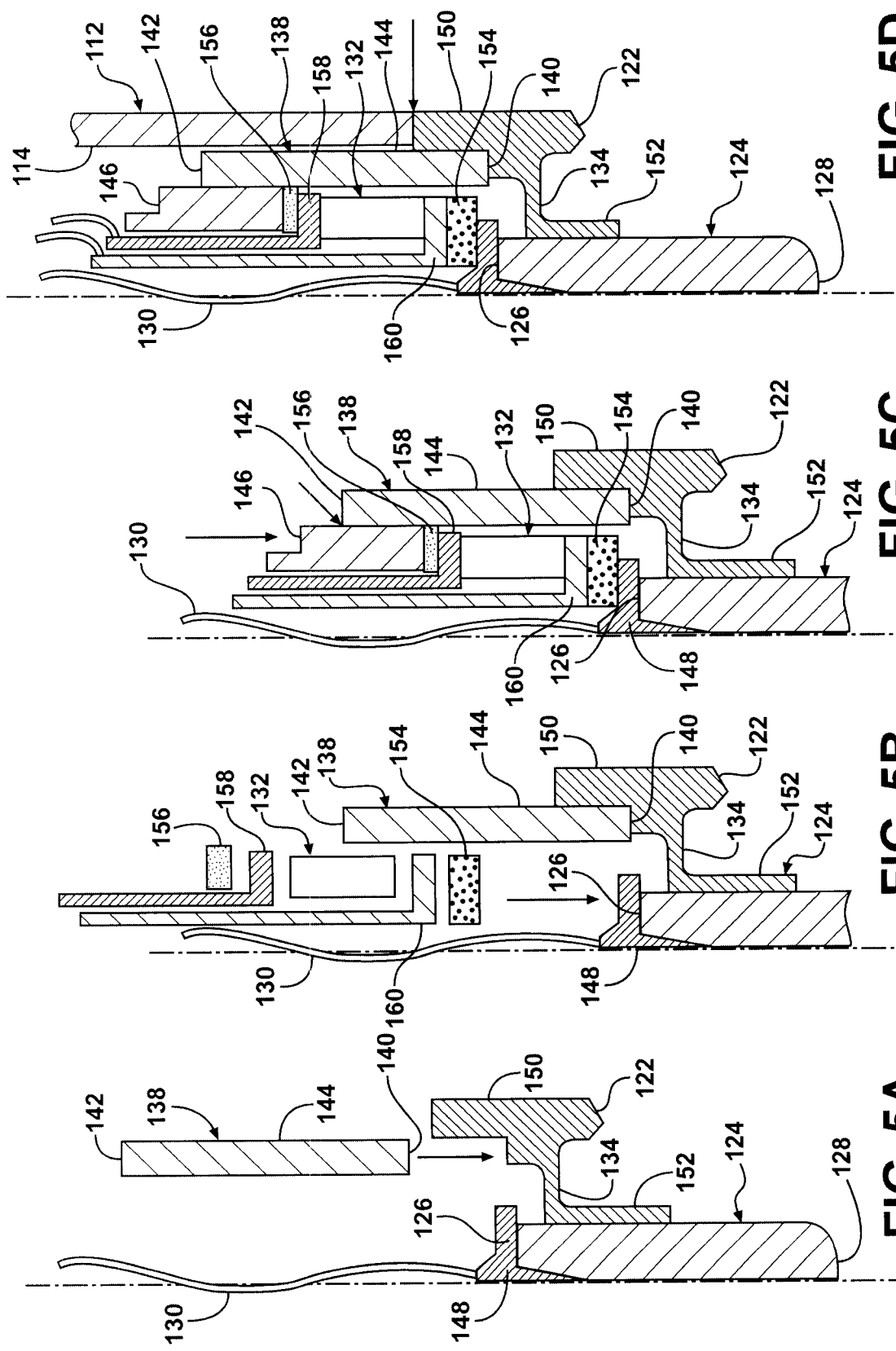
FIGS. 5A-D depict an assembly operation wherein the subject glow plug is assembled.

Referring to the Figures, wherein like numerals indicate like or corresponding parts throughout the several views, a glow plug according to the prior art is generally shown at 10 in FIGS. 1 and 2. The glow plug 10 includes an annular metal shell 12 having a bore 14 which extends along an imaginary longitudinal axis A. The shell 12 may be formed from any suitable metal, such as various grades of steel. The shell 12 may also incorporate a plating or coating layer, such as a nickel or nickel alloy coating over some or all of its surfaces including the exterior surface 16 and within the bore 14 so as to improve its resistance to high temperature oxidation and corrosion. The shell 12 includes external wrenching flats 18 or other suitably configured tool-receiving portion to advance screw threads 20 into an appropriately tapped hole in an engine cylinder head, pre-ignition chamber, intake manifold or the like. A tapered seat 22 bears against a complimentary-shaped pocket in the mating feature to perfect a pressure-tight seal in operation.

The glow plug assembly 10 includes a heater probe, generally indicated at 24. The heater probe 24 may be of the metallic or ceramic type. A metallic type heater probe 24 commonly includes a resistance heating element, powder packing material, and a seal. In the case of ceramic construction technology, the heater probe 24 will be constructed according to known ceramic designs. Regardless of a metallic or ceramic construction, the heater probe 24 will have a base end 26 (FIG. 2), supported in the shell 12, and a heating tip 28 opposite the base end 26. An electrode 30 makes electrical contact with the base end 26 of the heater probe 24 while maintaining electrical isolation from the shell 12. In the example of FIG. 2, the electrode 30 is formed with a tapering tip that seats within a mating socket formed in the base end 26 of the heater probe 24. Other joint designs are known in the art and can be used with effectiveness in this invention providing they are properly configured. A pressure sensor, generally indicated at 32, is disposed inside the shell 12 to form a fully integrated pressure sensing glow plug 10.

Referring still to FIG. 2, during assembly the electrode 30 is placed in tension to put the pressure sensor 32 into compression. Increased pressure acting on the heater probe 24 causes displacement of a flexible membrane 34 which allows movement of the center electrode 30. This, in turn, moves an upper retainer 36 in an upward direction, which has the effect of reducing the preloaded compressive force on the pressure sensor 32. Therefore, initial load, i.e., preload, in the electrode 30 must be enough to accommodate this fall in load plus any changes due to thermal effects in the pressure sensor assembly 32. Considering the long length of this assembly and its open nature, which leads to greater thermal differences, thermal effects can be substantial. Therefore, a large initial preload is needed in practice. This has the undesirable effect of separating the joint between the base end 26 of the heater probe 24 and the electrode 30.

Referring now to FIGS. 3, 4, and 5A-D a glow plug assembly according to the present invention is generally shown at 110. In FIGS. 3-5D, which illustrate one embodiment of the subject invention, reference numbers corresponding to those presented in FIGS. 1 and 2, but offset by 100, are used as a matter of convenience. As shown in these views, a canister, generally indicated at 138, is disposed within the shell 112 and surrounds the pressure sensor 132. The canister 138 extends between first 140 and second 142 ends thereof, such that the first end 140 is operatively affixed to the shell 112, whereas the second end 142 (acting through a cap member 146) is in pressing contact with the pressure sensor 132. The canister 138 is effective to establish a compressive preload force on the pressure sensor 132 without transmitting transient distortions occurring in the shell 112 to the pressure sensor 132. Furthermore, the canister 138 isolates the center electrode 130 from any preload forces, so that its connection to the heater probe 124 is not stressed by the preloading operation of the pressure sensor 132.

The shell 112 has an upper end adjacent its wrenching flats (not shown in FIGS. 3-5D) and a lower end adjacent the seat 122. The flexible pressure-sensitive membrane 134 is adapted for exposure to pressure fluctuations when installed in an engine and is preferably disposed at the lower end of the shell 112. The first end 140 of the canister 138 is directly joined to the shell 112 adjacent the pressure-sensitive membrane 134. As perhaps best shown in FIGS. 3 and 4, the canister 138 includes a generally cylindrical sidewall 144 and a cap member 146 that extends inwardly from the sidewall 144. The sidewall 144 is directly joined to the shell 112, whereas the cap member 146 bears in pressing engagement against the top of the pressure sensor 132. The cap member 146 can be brazed or welded to the sidewall 144, as indicated by the weld line visible in FIG. 3.

The specific joint design between the heater probe 124 and the electrode 130 can vary from one design to the next. In the disclosed embodiment, however, the heater probe 124 is shown including a probe contact 148 generally overlying its base end 126 for transmitting compressive preload forces from the pressure sensor 132 to the heater probe 124. As can be seen therefore, the center electrode 130 establishes electrical contact and connection to the contact pad 148, which in turn transmits electricity to the appropriate resistive elements contained within the heater probe 124.

The pressure-sensitive membrane 134 may take many forms, but in the preferred embodiment is integrally formed with a lower portion of the shell 112 such that it contains the annular seat 122. The pressure-sensitive membrane 134 may also include a rim section 150 that extends upwardly from the seat 122 a short distance. The rim section 150 has a mating interface for coupling directly to the first end 140 of the canister 138. In this example, the mating interface takes the form of a counter-bore which receives the first end 140 of the canister 138 in tight fitting, e.g., interference fit, manner. The pressure-sensitive membrane 134 also includes a thin flexible membrane section that extends radially inwardly from the rim section 150 to a sleeve portion 152. The sleeve portion 152 directly engages the outer surface of the heater probe 124 for transferring pressure induced movements of the heater probe 124 into the flexible membrane section.

Referring now to the pressure sensor 132, several components are stacked or assembled together to form the overall pressure sensing device. These elements include a lower insulation pad 154 disposed between the probe contact pad 148 and the pressure sensor 132. Similarly, an upper insulation pad 156 is disposed between the cap member 146 and the pressure sensor 132. Respective upper 158 and lower 160 sensor contacts directly abut the respective upper 156 and lower 154 insulation pads, on opposite sides of the pressure sensor 132. These contacts 158, 160 transmit electrical signals to and from the pressure sensor 132 for use in the engine management system, without touching either the charged electrode 130 or the grounded shell 112.

Because the canister 138 avoids placing any stress on the electrode 130 during the preload operation, there is no requirement that the electrode 130 be sufficiently rigid to carry compressive loads. Therefore, if desired, the electrode 130 may comprise a flexible cable, although a rigid electrode 130 is equally within the scope of design choice for this invention. Another advantage of this invention is realized by the closed format afforded by the canister 138, thereby leading to much lower initial preloads being required and more even temperature characteristics. Because the canister 138 has a substantially larger cross-section and smaller length than the center electrode 130, it is able to achieve higher measurement sensitivity than prior art designs which relied upon loads carried through the electrode. Furthermore, a reduction in the electrical noise in the system can be realized when the canister 138 acts as a grounded screen, via its direct connection to the grounded shell 112. Also, connection of the canister 138 to the shell 112 at its lower end, close to the membrane 134, means that changes in forces acting upon the shell 112 through the seat area 122 can be arranged to cause minimal changes in loads transferred to the pressure sensor 132.

FIGS. 5A-D illustrate a possible assembly process for the glow plug assembly 110. In this example, FIG. 5A shows the sidewall 144 portion of the canister 138 first attached to the rim section 150 of the pressure-sensitive membrane 134, which forms part of the shell 112. This connection can be accomplished by interference fit, welding, brazing or by other means. Also in this step, center electrode 130, in the form of a flexible cable, is directly connected to the contact pad 148 of the heater probe 124. Of course, if a rigid style electrode 130 is preferred, it can be used in place of the flexible cable. FIG. 5B shows the sensor components 154, 160, 132, 156, 158 assembled inside the sidewall 144, on top of the probe contact pad 148. In FIG. 5C, the cap member 146 is placed on top of the sensor stack and force is applied to provide the correct preload to the sensor 132. A rigid joint is made between the cap member 146 and the sidewall 144 of the canister 138, such as by welding, brazing or by other means. In FIG. 5D, the remaining electrical connections are made and the upper portion of the shell 112 is attached to the rim section 150 by an appropriate method such as welding or brazing.

Figure 6:
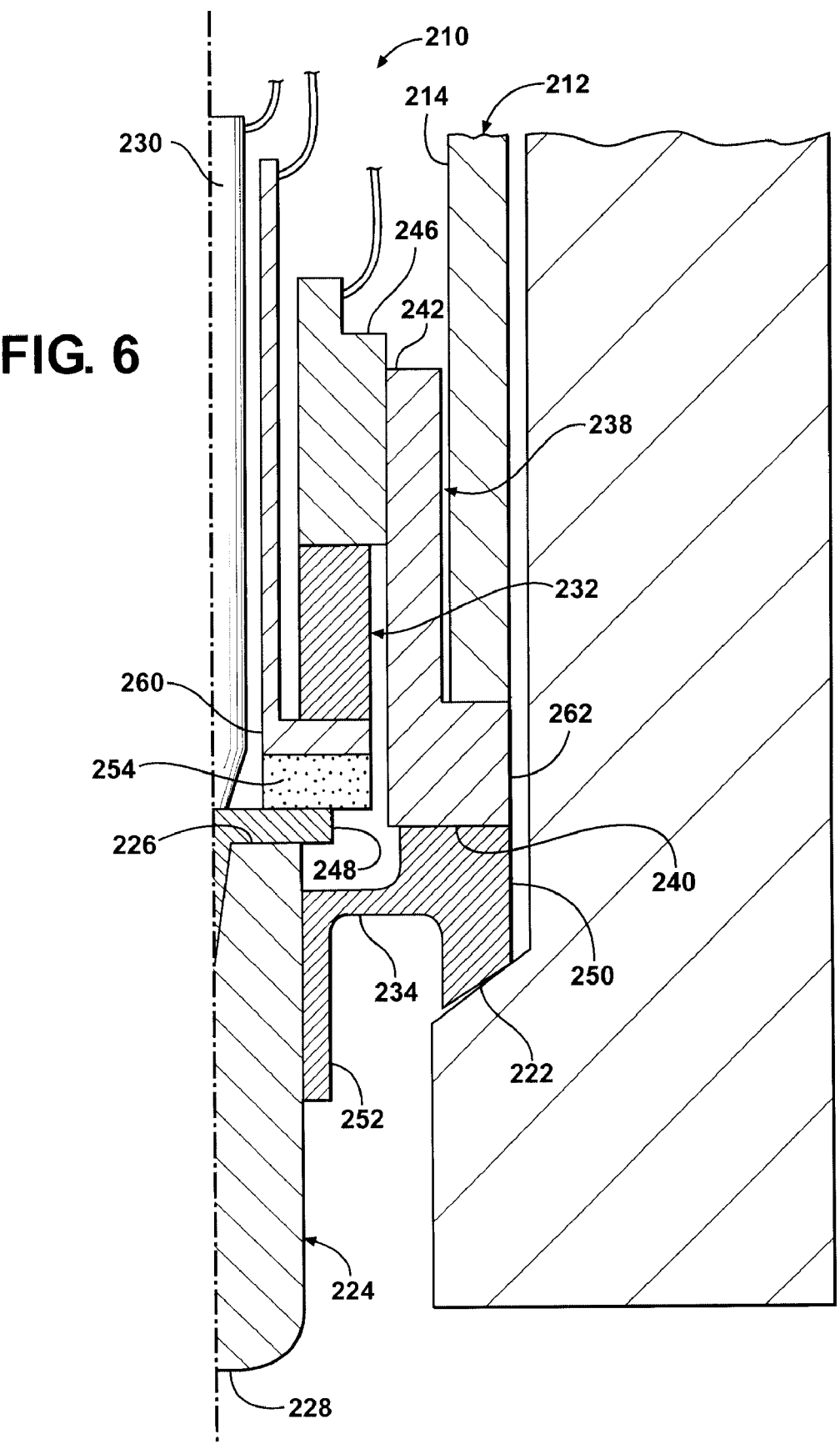
FIG. 6 is a glow plug assembly according to a first alternative embodiment of the subject invention.

FIG. 6 shows a first alternative embodiment of the subject glow plug assembly 210, wherein like or corresponding parts to those previously introduced are distinguished by the prefix 2. In this example, the variation to the electrical connection is shown, wherein only a lower sensor contact 260 is used together with a lower insulator pad 254. Both the upper insulator pad and upper sensor contact have been eliminated in this design, with electrical connection occurring directly through the cap member 246. Furthermore, in this first alternative embodiment, the construction of the shell 212 is changed, with a flange 262 extending outwardly from the sidewall 244 of the canister 238, and interposed between the rim section 250 and the upper portion of the shell 212.

Figure 7:
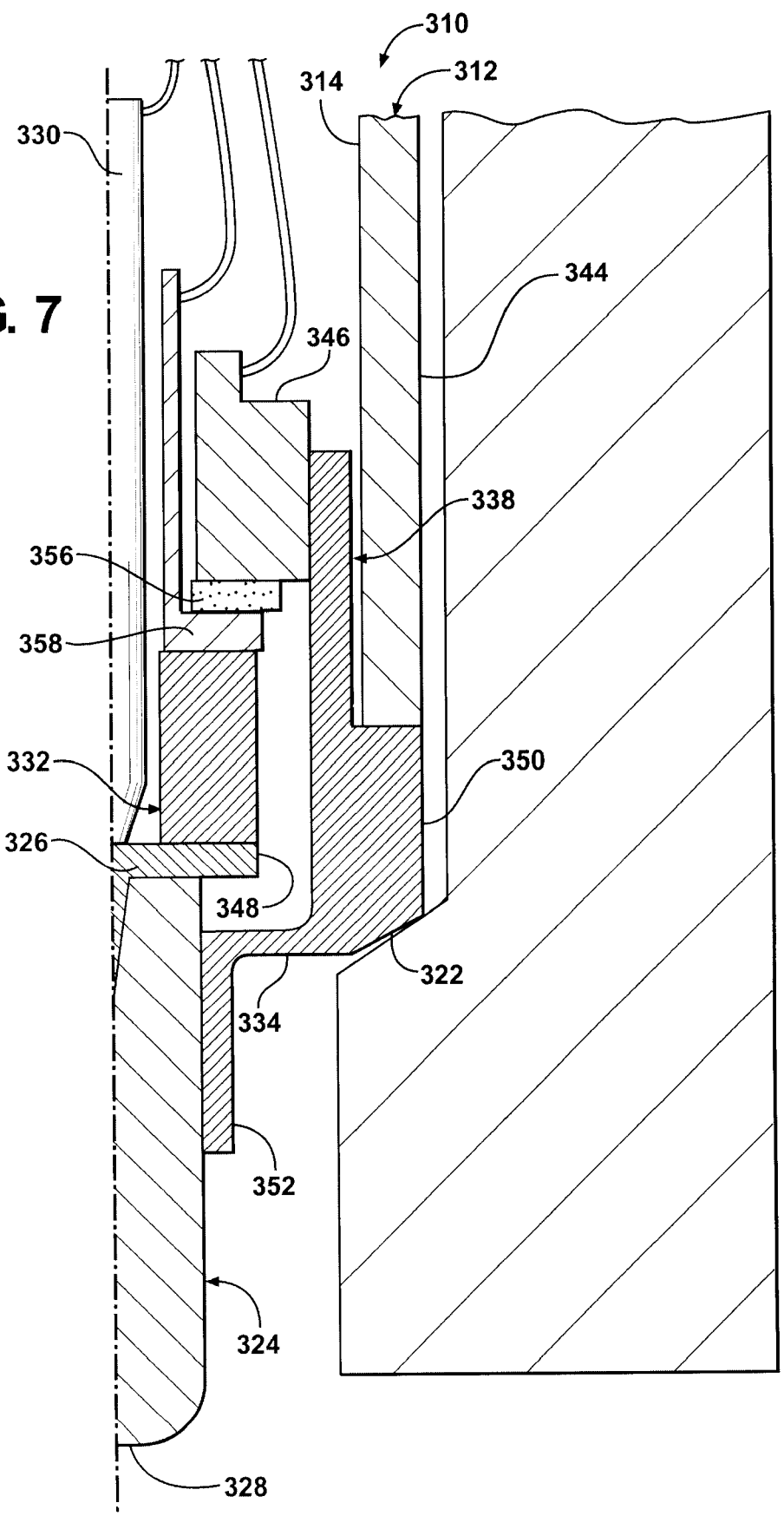
FIG. 7 is a cross-sectional view of a second alternative embodiment.

A second alternative embodiment of the glow plug assembly is generally shown at 310 in FIG. 7. Like or corresponding parts are here identified by common reference numerals beginning with the number 3. This second alternative embodiment is similar in many respects to the first alternative embodiment shown in FIG. 6, but in this instance the lower insulator pad and lower sensor contact have been eliminated. An upper insulator pad 356 and an upper sensor contact 358 are used. The canister 338 is integrated together with the pressure sensing membrane 334, such that the sidewall 344 is formed integrally with the rim section 350. The cap member 346 is attached to the sidewall 344 in a fashion similar to that described above. Of course, those of skill in the art will envision other configurations for the canister and its associated components without departing from the spirit of the invention.

Figure 8:
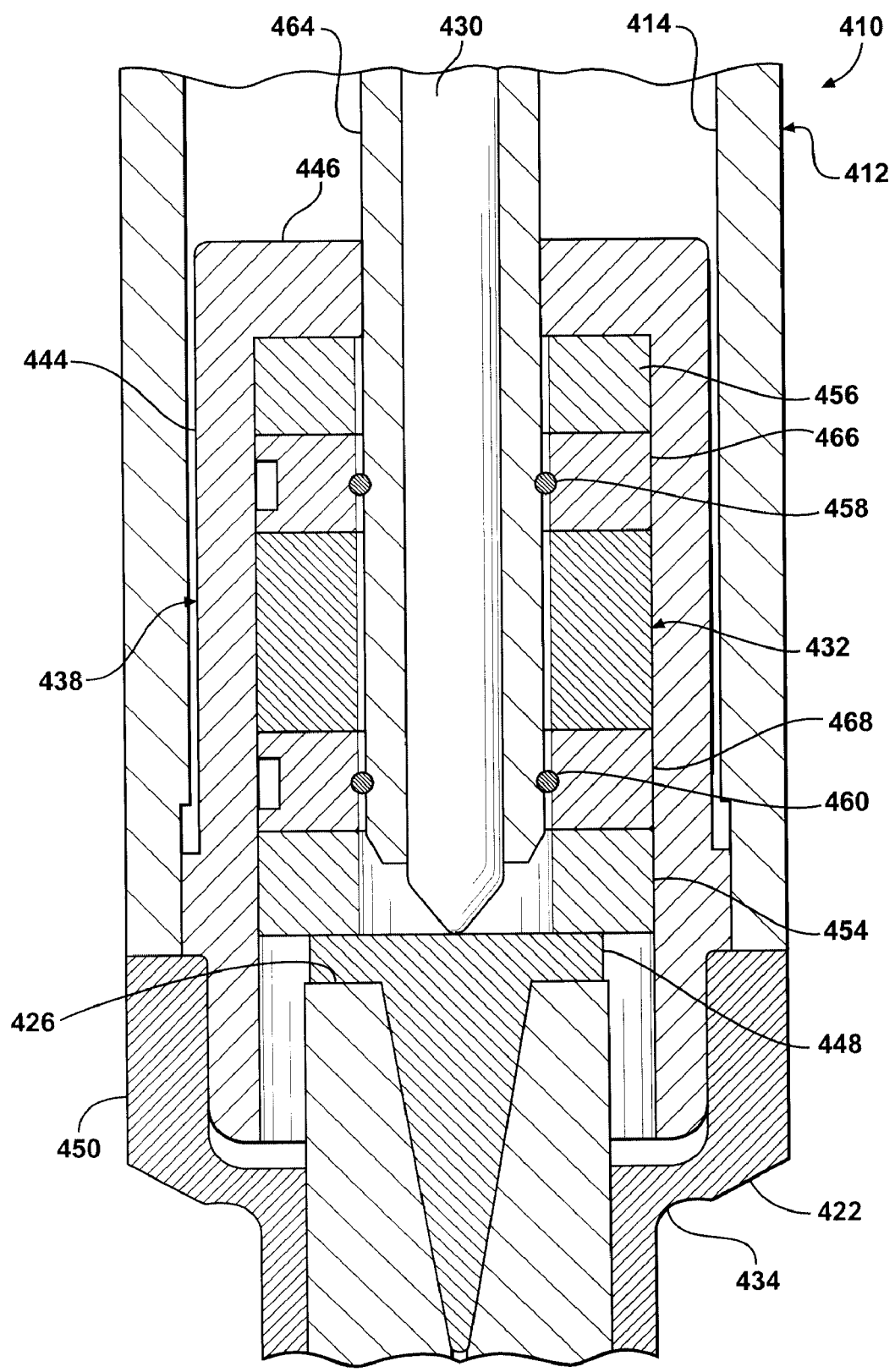
FIG. 8 is a cross-section of a third alternative embodiment.
Figure 9:
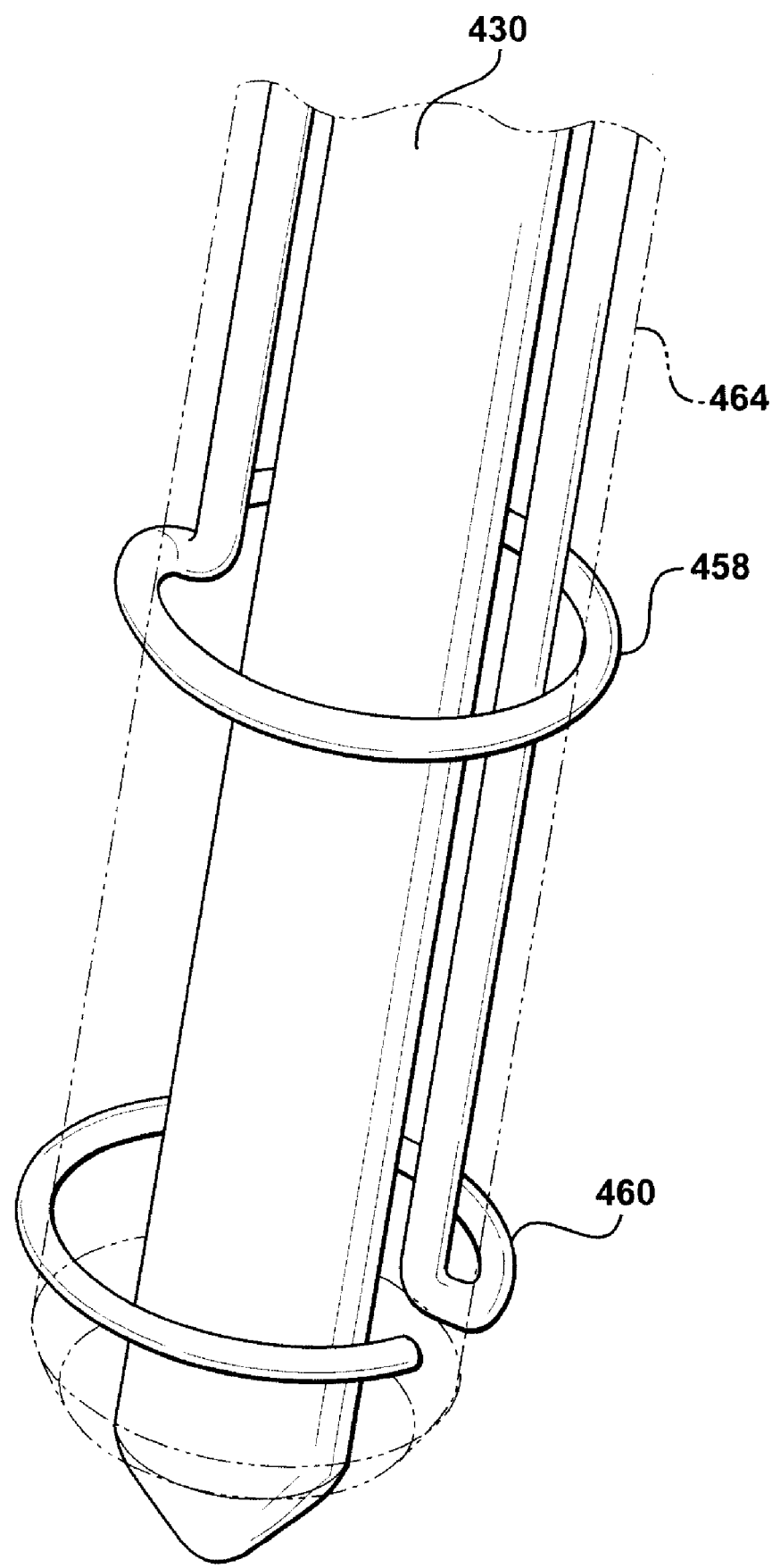
FIG. 9 is fragmentary perspective view of the electrode according to the third alternative embodiment shown in FIG. 8.

FIGS. 8 and 9 illustrate yet another, third alternative embodiment of this invention, generally indicated at 410, with like or corresponding parts identified by familiar reference numerals beginning with 4. In the case of this third alternative embodiment, electrical contacts to the pressure sensor 432 are not brought out of the canister 438, but rather the electrode 430 is specially configured to route the necessary electrical connections. More specifically, the electrode 430 is provided with an insulated cover 464. The electrode 430 in this example is rigid, although a flexible cable design may also be used. Here, the upper sensor contact 458 has a shaped wire configuration as shown in FIG. 9, and is supported in a groove on the outer surface of the cover 464. Likewise, the lower sensor contact 460 is supported in a groove on the cover 464. These sensor contacts 458, 460 have a bent circular configuration at the appropriate points of contact with respective upper 466 and lower 468 disk-like terminals positioned on opposite sides of the pressure sensor 432. In this design, the canister 438 is also uniquely shaped. The sidewall 444 and cap member 446 are formed as an integral unity without a subsequent joining operation being required. Preloading is accomplished when the canister 438 is seated in the rim section 450 of the pressure sensitive membrane 434, and joined thereto such as by interference fit, welding, brazing or other fixation technique.

The foregoing invention has been described in accordance with the relevant legal standards, thus the description is exemplary rather than limiting in nature. Variations and modifications to the disclosed embodiment may become apparent to those skilled in the art and fall within the scope of the invention, which is defined by the following claims.

What is claimed is:

1. A glow plug assembly for an internal combustion engine and having an integrated internal pressure sensor, said assembly comprising:
   a shell having an axially extending bore;
   an elongated heater probe having a base end disposed within said bore in electrical contact with said shell;
   an electrode in electrical contact with said base end of said heater probe while being electrically insulated from said shell;
   a pressure sensor disposed within said shell, said pressure sensor supported on one side thereof against said base end of said heater probe and adapted to measure pressure fluctuations when said glow plug assembly is installed in an engine;
   and a canister disposed within said shell and surrounding said pressure sensor, said canister extending between first and second ends thereof with said first end operatively fixed to said shell and said second end in pressing contact with said pressure sensor for establishing a compressive preload force on said pressure sensor without transmitting transient distortions occurring in said shell to said pressure sensor.

2. The assembly of claim 1, wherein said shell includes an upper end and a lower end, said shell further including a pressure-sensitive membrane at said lower end adapted for exposure to pressure fluctuations when installed in an engine, said first end of said canister being directly joined to said shell adjacent said pressure-sensitive membrane.

3. The assembly of claim 2, wherein said canister includes a generally cylindrical sidewall and a cap member extending inwardly from said sidewall, said sidewall being directly joined to said shell.

4. The assembly of claim 3, wherein said cap member is brazed or welded to said sidewall.

5. The assembly of claim 3, wherein said heater probe includes a probe contact pad generally overlying said base end thereof for transmitting compressive preload forces from said pressure sensor to said heater probe.

6. The assembly of claim 3, wherein said pressure-sensitive membrane includes an annular seat configured to establish a fluid-tight seal around said shell when installed in an engine.

7. The assembly of claim 6, wherein said pressure-sensitive membrane includes a rim section extending upwardly from said seat, said rim section including a mating interface for coupling directly to said first end of said canister.

8. The assembly of claim 7, wherein said pressure-sensitive membrane includes thin membrane section extending radially inwardly from said rim section.

9. The assembly of claim 8, wherein said pressure-sensitive membrane includes a sleeve portion extending from a radially inward edge of said membrane section and directly engaging said heater probe for transferring pressure induced movements of said heater probe to said membrane section.

10. The assembly of claim 3, further including an upper insulation pad disposed between said cap member and said pressure sensor.

11. The assembly of claim 3, further including a lower insulation pad disposed between said probe pad and said pressure sensor.

12. The assembly of claim 10, wherein said pressure sensor includes an upper sensor contact directly abutting said upper insulation pad.

13. The assembly of claim 1, wherein said electrode comprises a flexible cable.

14. The assembly of claim 1, wherein said heater probe includes an electrically and thermally conductive tubular sheath in electrical contact with said shell and a resistance heating element disposed in said sheath, said resistance heating element having a proximal end which is electrically connected to said electrode and a distal end electrically connected to a closed heating tip end of said sheath.

15. A method for manufacturing a glow plug assembly of the type having an integrated internal pressure sensor, said method comprising the steps of:
   forming a shell having an axially extending bore;
   forming an elongated heater probe having a base end and a heating tip opposite the base end;
   supporting the base end of the heater probe within the bore of the shell so as to establish electrical conductivity between the shell and the heater probe;
   electrically connecting an electrode to the base end of the heater probe while maintaining electrical insulation between the electrode and the shell;
   providing a canister having first and second ends;
   attaching the first end of the canister to the shell;
   providing a pressure sensor;
   placing the pressure sensor inside the canister so that the pressure sensor rests against the base end of the heater probe; and
   compressing the pressure sensor with the second end of the canister to establish a preload force on the pressure sensor.

16. The method of claim 15, wherein the canister includes a sidewall and a cap member; said step of compressing the pressure sensor including moving the cap member relative to the sidewall.

17. The method of claim 16, wherein said step of moving the cap member relative to the sidewall includes brazing or welding the cap member to the sidewall.

18. The method of claim 16, wherein said step of placing the pressure sensor inside the canister includes inserting an upper insulation pad between the cap member and the pressure sensor.

19. The method of claim 15, wherein said step of forming an elongated heater probe includes affixing a probe contact pad to the base end, and said step of placing the pressure sensor inside the canister includes inserting a lower insulation pad between the probe contact pad and the pressure sensor.

20. The method of claim 15 wherein said step of forming a shell includes pre-forming a pressure-sensitive membrane with an annular rim section, and said step of attaching the first end of the canister to the shell includes directly joining the first end of the canister to the rim section of the pre-formed pressure-sensitive membrane.

21. The method of claim 20, wherein the shell includes a body section distinct from the pre-formed pressure-sensitive membrane, further including the step of attaching the body section to the pre-formed pressure-sensitive membrane following said step of compressing the pressure sensor.

* * * * *

UNITED STATES PATENT AND TRADEMARK OFFICE
CERTIFICATE OF CORRECTION

PATENT NO. : 8,217,309 B2
APPLICATION NO. : 12/334568
DATED : July 10, 2012
INVENTOR(S) : Burrows et al.

It is certified that error appears in the above-identified patent and that said Letters Patent is hereby corrected as shown below:

| column | line | In the Specification |
|---|---|---|
| 5 | 22 | "a nm section" should read "a rim section" |

|  |  | In the Claims |
|---|---|---|
| 8 | 60 | Claim #22 (dependent claim) from the preliminary amendment is missing |

Signed and Sealed this
Twenty-fifth Day of June, 2013

Teresa Stanek Rea
*Acting Director of the United States Patent and Trademark Office*